No. 684,349. Patented Oct. 8, 1901.
F. A. BROWNELL.
FOCUSING DEVICE FOR CAMERAS.
(Application filed Feb. 7, 1901.)
(No Model.)
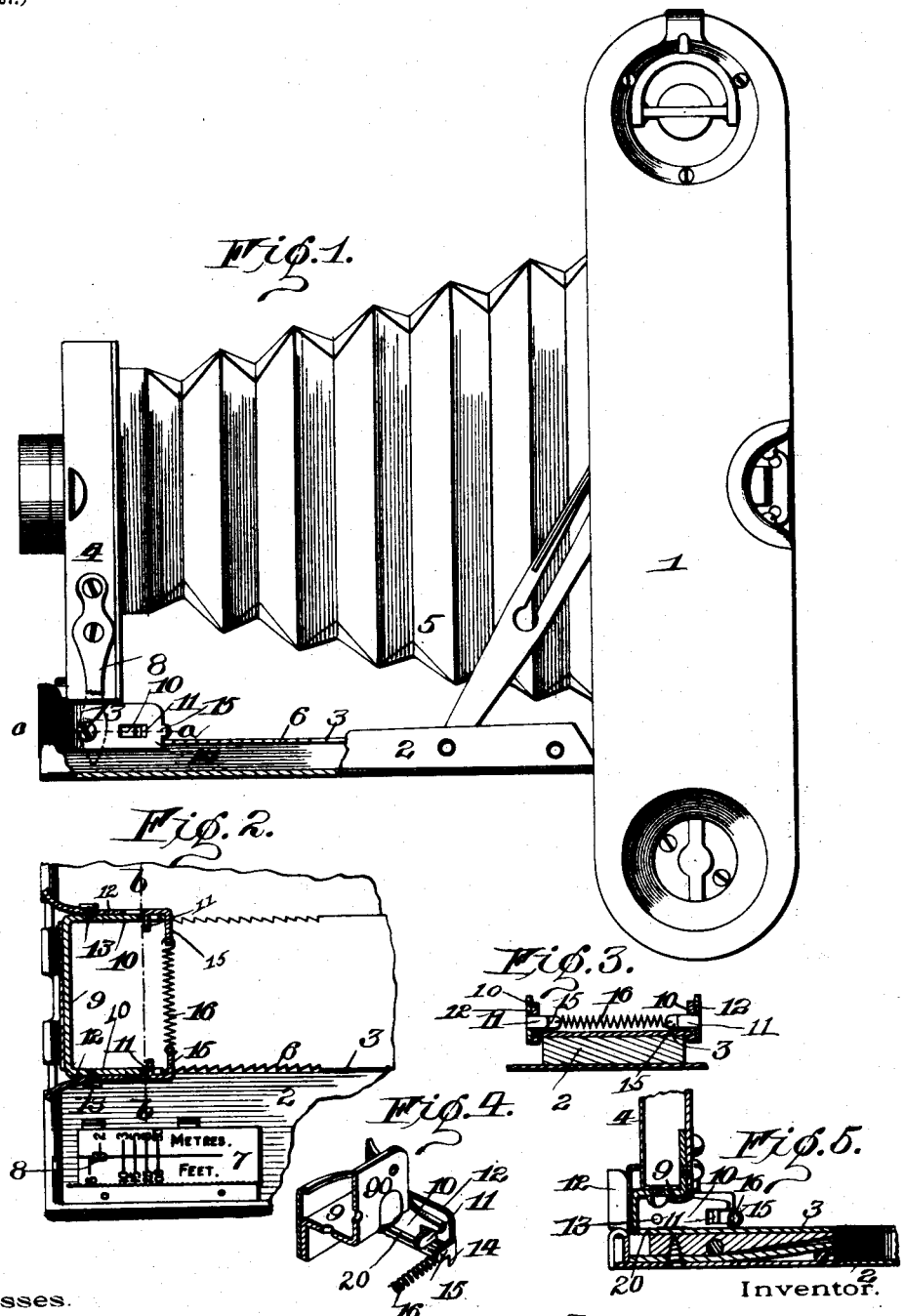
Witnesses.
Walter B. Payne
Elizabeth J. Perry
Inventor.
Frank A. Brownell
by Frederick L. Church
his Attorney.

UNITED STATES PATENT OFFICE.

FRANK A. BROWNELL, OF ROCHESTER, NEW YORK, ASSIGNOR TO EASTMAN KODAK COMPANY, OF SAME PLACE.

FOCUSING DEVICE FOR CAMERAS.

SPECIFICATION forming part of Letters Patent No. 684,349, dated October 8, 1901.

Original application filed July 25, 1900, Serial No. 24,798. Divided and this application filed February 7, 1901. Serial No. 46,324. (No model.)

*To all whom it may concern:*

Be it known that I, FRANK A. BROWNELL, of Rochester, in the county of Monroe and State of New York, have invented certain new and useful Improvements in Focusing Devices for Cameras; and I do hereby declare the following to be a full, clear, and exact description of the same, reference being had to the accompanying drawings, forming a part of this specification, and to the reference-numerals marked thereon.

My present invention relates to focusing devices for cameras, and has for its object to provide an improved device for holding and releasing the adjustable front or any other portion of the camera which is moved in focusing, whereby the operations may be readily accomplished by the operator and the construction and adaptation for practical use facilitated, all as will be hereinafter fully described and the novel features pointed out in the claims at the end of this specification.

This application is a division of an application, Serial No. 24,798, filed July 25, 1900.

In the drawings, Figure 1 is a side elevation of a camera, showing my improvements applied thereto; Fig. 2, a horizontal sectional view on the line $a\,a$ of Fig. 1; Fig. 3, a vertical sectional view on the line $b\,b$ of Fig. 2; Fig. 4, a sectional perspective view of the bracket for the lens-support; Fig. 5, a vertical sectional view.

Similar reference-numerals in the several figures indicate similar parts.

The form of camera to which I have shown my invention applied is that contained in the parent application, Serial No. 24,798, embodying a main casing 1, a hinged support or door 2, having a way-plate 3 thereon, upon which is adjusted the part by which the focusing is attained, in the present embodiment a lens support or casing 4, to which the bellows 5 is attached.

The way-plate 3 is provided near its forward end with serrations or notches 6 for the engagement of holding-catches mounted on the movable frame or carriage, as will be described, and the support or door 2 is provided with a scale 7, preferably indicating in feet and meters the distance of the object being focused, with which coöperates a pointer or index 8, attached to the carriage or lens-support.

9 indicates a bracket, preferably composed of sheet metal, embodying the connecting web or body, the horizontally and vertically extending portions or flanges 90 for attachment to the casing or support 4, and the side wings or flanges 10, extending parallel with the sides of the way-plate 3 and provided in the proximate sides with grooves 20 to receive the edges of the way-plate, as shown in Fig. 3, said flanges being slotted at the rear to receive and guide ears or lugs 11, struck out from the catch-plates 12, arranged on the outer sides of the flanges of the bracket and held by screws or projections 13, passing loosely through them and entering the sides of the bracket or frame, as shown in Fig. 2. These catches or plates 12 are slightly curved at their forward ends away from the bracket to form grasping portions, and their rear ends are provided near the lower sides with the sharpened ends 14, adapted to engage the serrations in the way-plate, and above these ends are perforated inwardly-extending lugs or ears 15, connected by a spring 16. The tendency of the spring being to draw the rear ends of the catch-plates together, they will be held normally in engagement with the way-plate, as in Fig. 2; but by grasping the outer ends of the catches they may be disengaged and the bracket and the part carried thereby moved in or out for focusing when desired.

The parts, it will be noted, are constructed of sheet metal and may be readily assembled by an unskilled operator, their attachment being accomplished by the screws 13.

While the focusing device is shown applied to the front frame or lens-support of a camera, I do not desire to be confined to this arrangement, as the same parts could be used in other connections.

I do not claim herein broadly the curved or bent catch-plates arranged at the sides of the bracket or support, having their front ends constituting grasping devices and their rear ends having engaging parts, as this forms the subject-matter of another pending application.

I claim as my invention—

1. In a camera the combination with a way, of a support movable on the way having the slots at the sides, the clamping-arms pivoted on the sides of the support having the tongues extending in the slots, and the spring connecting their rear ends.

2. In a camera the combination with a way, a movable supporting-bracket having the grooved side flanges for engaging the way and provided with the slots, of the curved catch-plate arranged at the side of the bracket having the tongue or projection entering the slot and the outer operating end, and the spring for operating the engaging portion of the catch toward the way-plate to clamp it.

3. In a camera the combination with a way-plate, the bracket having the grooved side flanges engaging the way and provided with the slots, of the two bent catch-levers pivoted to the sides of the bracket adapted to engage the way and having the tongues entering the slots, and the spring connecting the rear ends of the levers.

4. In a camera the combination with a way-plate, the bracket movable thereon composed of the integral horizontal and vertical webs and the grooved and slotted side flanges, of the bent catch-levers pivoted loosely upon the side flanges having the tongues entering the slots, and the spring connecting the rear ends of the levers.

5. In a camera the combination with the serrated way-plate, the bracket movable thereon having the grooved and slotted side flanges, of the bent catch-levers having the tongues entering the slots and the catch portion engaging the serrations on the way, the projections on the bracket extending laterally through the levers, and the spring connecting the rear ends of the levers.

FRANK A. BROWNELL.

Witnesses:
JOHN E. LENAHAN,
F. F. CHURCH.